United States Patent
Harper

(10) Patent No.: US 7,703,338 B2
(45) Date of Patent: Apr. 27, 2010

(54) STEAM METER

(75) Inventor: Charles Neely Harper, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 0 days.

(21) Appl. No.: 12/207,868

(22) Filed: Sep. 10, 2008

(65) Prior Publication Data

US 2009/0064795 A1 Mar. 12, 2009

Related U.S. Application Data

(60) Provisional application No. 60/971,700, filed on Sep. 12, 2007.

(51) Int. Cl.
*G01F 1/44* (2006.01)

(52) U.S. Cl. .................................. 73/861.63

(58) Field of Classification Search .............. 73/861.63, 73/861.42, 861.64
See application file for complete search history.

(56) References Cited

U.S. PATENT DOCUMENTS

| | | | | |
|---|---|---|---|---|
| 3,716,306 A | * | 2/1973 | Martin et al. | ............... 417/44.4 |
| 3,930,756 A | * | 1/1976 | Bruggeman | ............... 417/199.2 |
| 4,302,423 A | * | 11/1981 | Cheng et al. | ................. 422/111 |
| 5,063,787 A | | 11/1991 | Khuzai et al. | |
| 5,501,099 A | * | 3/1996 | Whorff | ....................... 73/29.01 |
| 2005/0229716 A1 | * | 10/2005 | Unsworth et al. | ......... 73/861.53 |

FOREIGN PATENT DOCUMENTS

| | | |
|---|---|---|
| DE | 19949304 | 4/2001 |
| JP | 60178316 | 9/1985 |
| WO | 0208702 | 1/2002 |

OTHER PUBLICATIONS

Search Report of PCT/IB2008/053660.
Written Opinion of PCT/IB2008/053660.

* cited by examiner

*Primary Examiner*—Jewel Thompson
(74) *Attorney, Agent, or Firm*—Donna Blalock Holguin

(57) ABSTRACT

A flowmeter detects a differential pressure of steam as the steam passes through a conduit with a feature shaped to produce changes in velocity and pressure of the steam. Taps used to enable detection of the differential pressure extend from a wall of the conduit upward toward vertical (defined as parallel to the direction of gravitational force) in order to drain liquid water into the conduit from the tap. The differential pressure measured enables calculation of flow rate of the steam.

20 Claims, 2 Drawing Sheets

STEAM METER

CROSS-REFERENCE TO RELATED APPLICATIONS

This application claims the benefit under 35 U.S.C. § 119(e) to provisional application No. 60/971,700, filed Sep. 12, 2007, the entire contents of which are incorporated herein by reference.

BACKGROUND

Conduits in many applications carry steam utilized for its heat or its ability to be converted to mechanical work. These applications often require measuring flow of the steam through the conduits. In one example, such measurements enable determining quantity of the steam purchased. The quantity and cost to generate the steam can make annual value of the steam worth substantial sums of money. Accordingly, proper accounting for these purchases relies on accuracy of metering.

One prior meter design utilizes a differential pressure measured across a restriction in the conduit. However, configurations for such previous steam meters produce results subject to errors. Further, difficult calibration procedures for these meters add to inaccuracy of the results.

Therefore, a need exists for improved meters to measure flow of steam.

SUMMARY

In one embodiment, a steam meter includes a steam-conveying conduit defining a fluid-flow-pressure-change-inducing-section. First and second ports through a wall of the conduit are spaced apart across the section. First and second tap ducts coupled respectively to the first and second ports extend from the wall of the conduit at an angle less than 90° from vertical, which is defined as parallel to gravitational force, such that orientation of the tap ducts drains liquid into the conduit from the tap ducts. First and second sensing ducts couple respectively to the first and second tap ducts and are filled with liquid up to levels limited by communication with the tap ducts. At least one pressure sensor couples to at least one of the sensing ducts.

According to one embodiment, a method of measuring a flow rate of steam includes conveying the steam through a conduit. First and second tap ducts are coupled respectively to first and second ports through a wall of the conduit along part of the conduit that defines a fluid-flow-pressure-change-inducing section. The method further includes draining liquid from the tap ducts into the conduit by orienting the tap ducts to extend from the wall of the conduit at an angle less than 90° from vertical, which is defined as parallel to gravitational force. In addition, the method includes detecting a differential pressure across the section, wherein the differential pressure is established through the ports and tap ducts to first and second sensing ducts filled with liquid up to levels limited by communication with the tap ducts. The differential pressure detected enables calculating the flow rate of the steam.

In one embodiment, a method of measuring flow rate of steam includes conveying the steam through a conduit. First and second tap ducts are coupled respectively to first and second ports through a wall of the conduit along part of the conduit that defines a fluid-flow-pressure-change-inducing section. The method includes closing first and second valves disposed respectively along the first and second tap ducts, introducing liquid into ends of the tap ducts distal relative to the conduit such that the liquid fills first and second sensing ducts, and opening the valves to drain liquid from the tap ducts oriented to extend from the wall of the conduit at an angle less than 90° from vertical, which is defined as parallel to gravitational force. Further, the method includes detecting a differential pressure across the section, wherein the differential pressure is established through the ports and tap ducts. The differential pressure detected enables calculating the flow rate of the steam.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Embodiments of the invention generally relate to flowmeters. In one embodiment, the flowmeter detects a differential pressure of steam as the steam passes through a conduit with a feature shaped to produce changes in velocity and pressure of the steam. Taps used to enable detection of the differential pressure extend from a wall of the conduit at an angle less than 90° from vertical (defined herein as parallel to gravitational force). Orientation of the taps drains liquid water into the conduit from the taps. Since the taps extend from the wall upward in the vertical direction, this draining mitigates or avoids errors from condensation in the taps and improper calibration. The differential pressure measured enables calculation of flow rate of the steam.

Exemplary applications for the flowmeters include conduits within steam distribution networks or at a power plant. The conduit may couple to a turbine for electric generation at the power plant. For some embodiments, the size of the conduit may be between 30 centimeter (cm) and 100 cm in diameter.

Figure 1:
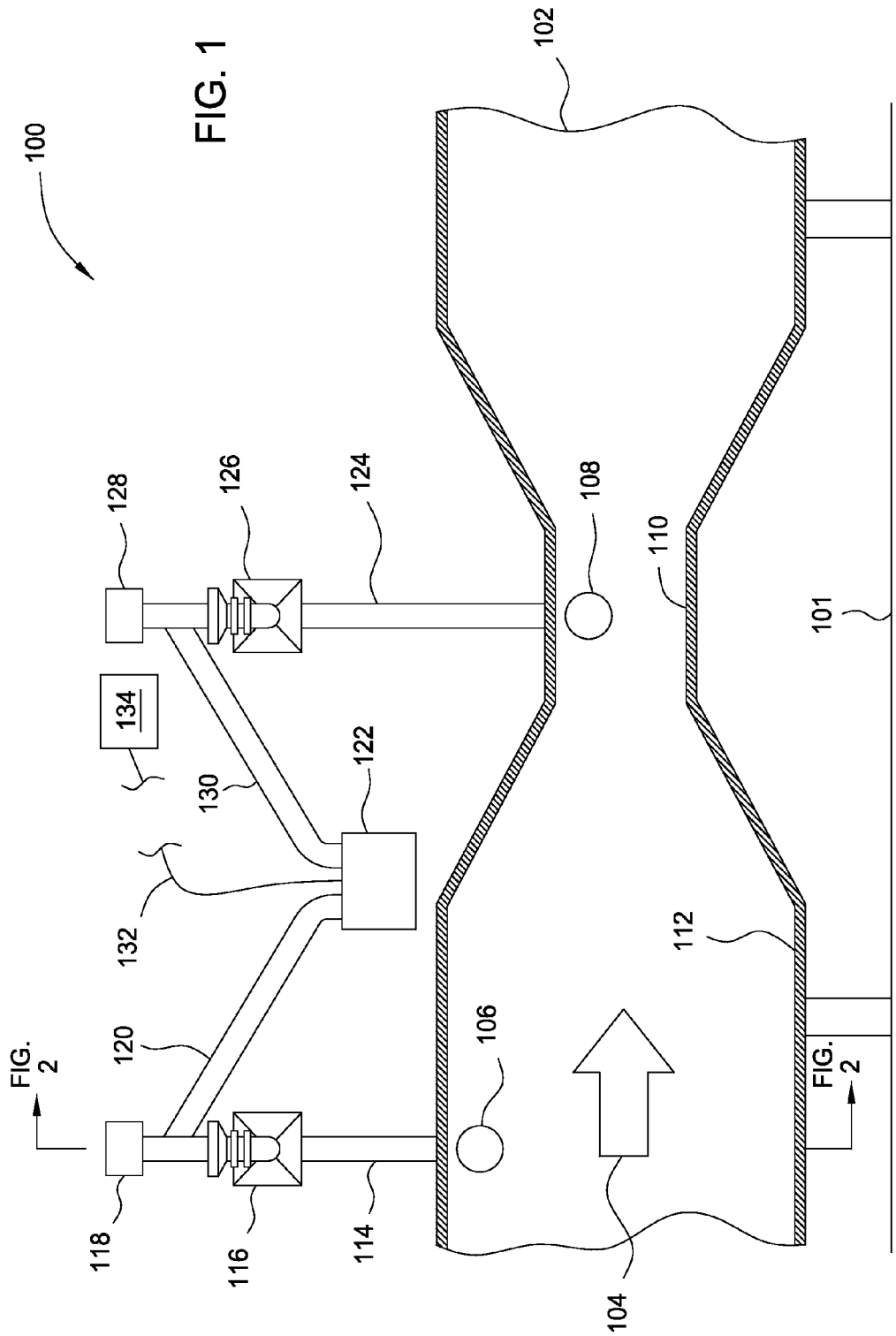
FIG. 1 illustrates a cross-sectional side view of a steam meter, according to one embodiment of the invention.

FIG. 1 shows a side view of a steam meter 100 disposed along a conduit 102. The conduit 102 as depicted runs parallel to a ground surface 101 of earth and is supported above the surface 101. While reference to this orientation is described herein, other orientations may incorporate aspects disclosed and achieve like benefits. The side view illustrates the steam meter 100 in cross section taken longitudinally down a bore of the conduit 102. In operation, the steam meter 100 measures flow rate of a fluid 104 (depicted by an arrow) flowing through the conduit 102.

For some embodiments, a condensable gas such as steam forms the fluid 104, which is in a gaseous phase and may contain only pure vaporized water or vaporized water mixed with one or more other gasses (e.g., air). The fluid 104 may be at a temperature and pressure such that the fluid is superheated and contains no liquid phase. If small amounts of the liquid phase relative to volume of the fluid 104 are reintroduced to the fluid 104, the liquid phase returns to the gaseous phase due to the superheating of the fluid 104.

A fluid-flow-pressure-change-inducing-section of the conduit 102 defines part of the steam meter 100 and has a feature such as a flow nozzle, an orifice plate, or V-cone that produces changes in velocity and pressure of the fluid 104 according to conservation of energy and mass as the fluid 104 passes through the feature. As shown, the feature defines a Venturi with a first inner diameter 112 that converges to a smaller second inner diameter 110 at a throat of the Venturi. The conduit 102 defines both an entry frustoconical shape converging to the throat and an exit frustoconical shape diverging from the throat. The throat may maintain the second inner diameter 110 and spaces apart this convergence and divergence along the conduit 102.

First and second ports 106, 108 through a wall of the conduit 102 enable measuring pressure of the fluid 104 at locations of the ports 106, 108. As a result of the locations for the ports 106, 108, the first port 106 provides fluid communication with the fluid 104 at the first inner diameter 112 while the second port 108 is in fluid communication with the fluid 104 at the second inner diameter 110. Restriction caused by the second inner diameter 110 creates a differential pressure that can be detected between the ports 106, 108 and used in flow rate calculations regardless of whether the first port 106 is upstream or downstream of the second port 108.

The steam meter 100 further includes first and second tap ducts 114, 124 that are each coupled to an outside surface of the conduit 102. The first and second tap ducts 114, 124 respectively align with the first and second ports 106, 108. First and second sensor ducts 120, 130 respectively couple the first and second tap ducts 114, 124 to at least one pressure sensor, such as a differential pressure sensor 122. In some embodiments, discrete absolute pressure sensors may replace the differential pressure sensor 122 such that pressure transmitted by each of the ports 106, 108 is detected. Calculation of differences in readings of the absolute pressure sensors thus also enables determination of the differential pressure.

Signal line 132 couples the pressure sensor 122 to processing equipment 134 configured with logic to calculate the flow rate of the fluid 104 based on detection of the differential pressure by the pressure sensor 122. While such signal processing is conventional, physical configuration of components forming the steam meter 100 provides accurate detection of the differential pressure relied on to achieve accurate results with the signal processing. The following describes embodiments for this physical configuration.

In some embodiments, the tap ducts 114, 124 and sensor ducts 120, 130 have an inner diameter that is between 0.5 cm and 5.0 cm. As the diameter increases, tendency for siphoning decreases. Further, the inner diameter of the tap ducts 114, 124 may or may not match the inner diameter of the sensor ducts 120, 130. While shown as circular in cross section, the tap ducts 114, 124 and sensor ducts 120, 130 may define other shapes such as polygonal.

The tap ducts 114, 124 extend from the wall of the conduit 102 and may be substantially straight. First and second caps 118, 128 seal respective ends of the tap ducts 114, 124 distal to the conduit 102. First and second valves 116, 126 disposed respectively along the first and second tap ducts 114, 124 enable fluid isolation of the pressure sensor 122 from the conduit 102.

Figure 2:
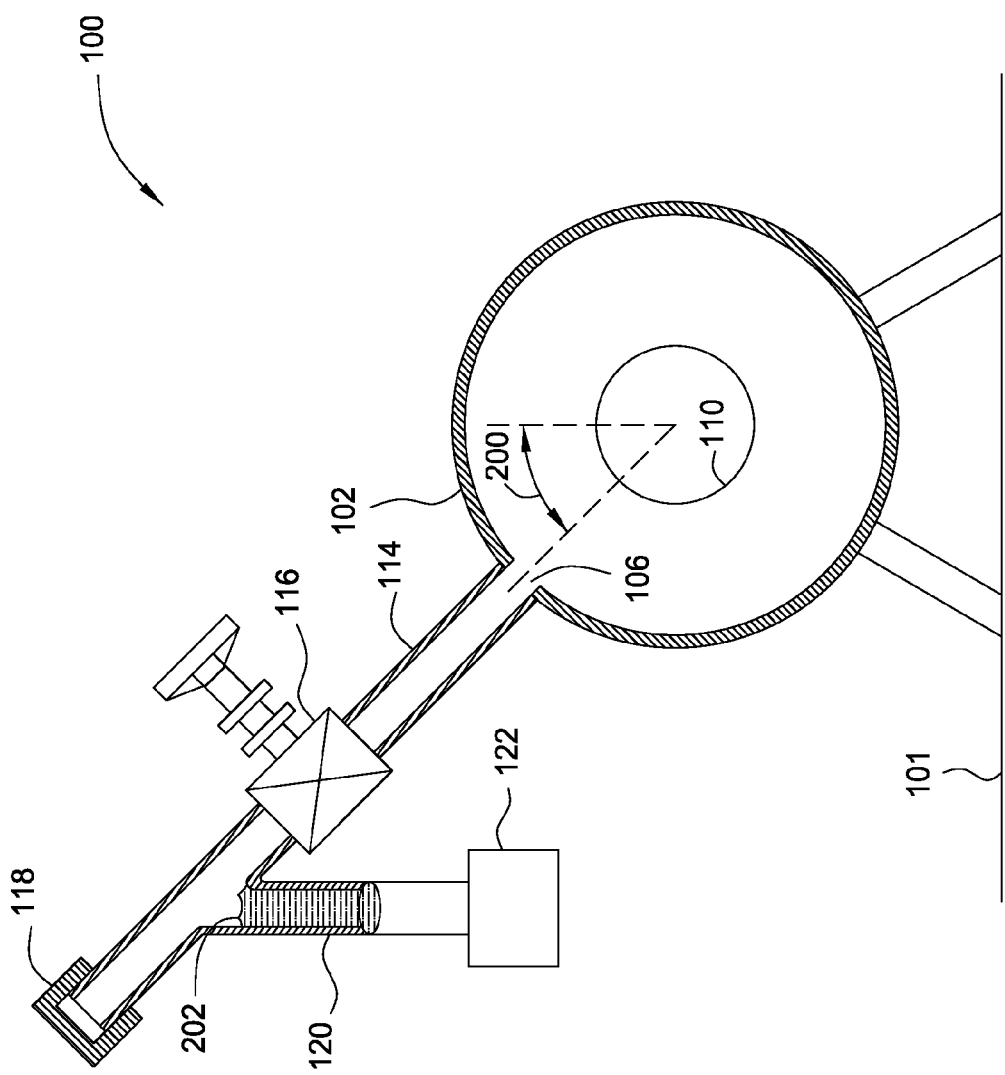
FIG. 2 illustrates a cross-sectional end view of the steam meter taken across line 2-2 in FIG. 1, according to one embodiment of the invention.

FIG. 2 illustrates the steam meter 100 in cross section taken transverse to the length of the conduit 102 as shown by line 2-2 in FIG. 1. The second tap duct 124, which is hidden behind the first tap duct 114, is analogous to the first tap duct 114 in function and interrelations and thus not described separately. The first tap duct 114 extends from the wall of the conduit 102 at an angle 200 (depicted by an arrow) that is less than 90° relative to vertical and that is selected to drain into the conduit 102 liquid from the first tap duct 114. For some embodiments, the angle 200 permits draining and avoids siphoning as discussed herein by being between 15° and 75° or between 45° and 75°.

In operation, the fluid 104 enters the first tap duct 114 where temperature of the fluid 104 falls as a function of distance from the conduit 102. The fluid becomes liquid once the temperature of the fluid 104 reaches condensing temperature. Any liquid condensate however falls back into the conduit 102 and is not retained in the first tap duct 114. Retention of liquid condensate in the first tap duct 114 influences pressure readings and is thus avoided with sufficient slope provided by the angle 200. In particular, the angle 200 prevents influence of any possible liquid condensate in the first tap duct 114 on calibration that is based on a preset amount of liquid 202 (e.g., water) that fills the first sensing duct 120.

For some embodiments, the first tap duct 114 couples in a perpendicular relation to the wall of the conduit 102. As such, the angle 200 further corresponds to the location of the first port 106 around a circumference of the conduit 102. In these situations, values for the angle 200 approaching zero (i.e., the first tap duct 114 directly on top of the conduit 102) tend to increase potential for the first tap duct 114 to hold liquid due to a siphoning phenomena. Offsetting the first tap duct 114 from directly on top of the conduit 102 ensures proper functioning of the steam meter 100 and transmission of pressure through the first tap duct 114. Regardless of circumferential position, the angle 200 that the first tap duct 114 extends from the conduit 102 supports draining of the first tap duct 114 making it also possible to have the first tap duct 114 tangential to the conduit 102.

The first sensing duct 120 extends from the first tap duct 114 at a location between the first valve 116 and the first cap 118 and in a direction toward the ground surface 101. The liquid 202 thereby stays in the first sensing duct 120 up to where the first sensing duct 120 and the first tap duct 114 intersect. The first sensing duct 120 bends toward the pressure meter 122, which is located between the first and second tap ducts 114, 124. In operation, pressure from the fluid 104 is established through the first tap duct 114 and acts on the liquid 202 contained in the first sensing duct 120. The pressure sensor 122 thereby detects pressure of the fluid 104 as transmitted to the pressure sensor 122 via the liquid 202.

Calibrating of the pressure sensor 122 requires the water 202 to be in the first sensing duct 120. A set-up procedure for the calibration includes closing the first valve 116 and introducing the liquid 202 into the end of the first tap duct 114 while the first cap 118 is removed from the end. This filling may occur prior to securing the first cap 118 to the first tap duct 114 and continues until the liquid 202 overfills the first sensing duct 120. Thereafter, the first cap 118 is secured to the first tap duct 114 by threads and/or welding, and the first valve 116 is opened to let excess of the liquid 202 flow into the conduit 102. Once both the first and second sensing ducts 120, 130 have been accordingly filled, the calibration of the pressure sensor 122 accounts for the liquid 202.

A comparison was performed between an embodiment of the present invention (steam meter 100) and a comparison device. The comparison device had tap ducts extending horizontal with respect to vertical. The steam meter 100 according to an embodiment of the present invention had orientation of the tap ducts 114, 124 arranged at 45° relative to the vertical direction and provided improved results relative to the comparison device. In a test setup, water was vaporized and passed through the steam meter 100 and the comparison device. Actual volume of the steam passing through the meter 100 or the comparison device was determined by measuring the water that was converted to the steam. The steam meter 100 yielded accurate results. However, the comparison device obtained a false result with about a 5% error.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A steam meter, comprising:
   a steam-conveying conduit defining a fluid-flow-pressure-change-inducing-section;
   first and second ports through a wall of the conduit, wherein the ports are spaced apart across the section;
   first and second tap ducts coupled respectively to the first and second ports and extending from the wall of the conduit at an angle less than 90° from vertical, which is defined as parallel to gravitational force, wherein orientation of the tap ducts drains liquid into the conduit from the tap ducts;
   first and second sensing ducts coupled respectively to the first and second tap ducts, wherein the sensing ducts are filled with liquid up to levels limited by communication with the tap ducts; and
   at least one pressure sensor coupled to at least one of the sensing ducts.

2. The steam meter of claim 1, wherein the angle is between 15° and 75°.

3. The steam meter of claim 1, wherein the at least one pressure sensor comprises a differential pressure sensor in fluid communication with both the first and second sensing ducts.

4. The steam meter of claim 1, further comprising signal processing equipment coupled to the at least one pressure sensor, wherein the signal processing equipment is configured to calculate a flow rate of steam flowing through the steam-conveying conduit based on a differential pressure transmitted through the first and second ports.

5. The steam meter of claim 1, wherein the fluid flow pressure change inducing section comprises a Venturi.

6. The steam meter of claim 1, wherein the first port is located in a larger inner diameter of the conduit than the second port.

7. The steam meter of claim 1, wherein the first and second ports are located around a circumference of the conduit corresponding with the angle.

8. The steam meter of claim 1, wherein the liquid comprises water.

9. A method of measuring a flow rate of steam, comprising:
   conveying the steam through a conduit, wherein first and second tap ducts are coupled respectively to first and second ports through a wall of the conduit along part of the conduit that defines a fluid-flow-pressure-change-inducing section;
   draining liquid from the tap ducts into the conduit by orienting the tap ducts to extend from the wall of the conduit at an angle less than 90° from vertical, which is defined as parallel to gravitational force; and
   detecting a differential pressure across the section, wherein the differential pressure is established through the ports and tap ducts to first and second sensing ducts filled with liquid up to levels limited by communication with the tap ducts; and
   calculating the flow rate of the steam based on the differential pressure detected.

10. The method of claim 9, wherein the angle is between 15° and 75°.

11. The method of claim 9, wherein the fluid flow pressure change inducing section comprises a Venturi.

12. The method of claim 9, wherein the first port is located in a larger inner diameter of the conduit than the second port.

13. The method of claim 9, wherein the first and second ports are located around a circumference of the conduit corresponding with the angle.

14. The method of claim 9, further comprising:
    closing first and second valves disposed respectively along the first and second tap ducts;
    introducing the liquid into ends of the tap ducts distal to the conduit, wherein the liquid fills the first and second sensing ducts; and
    opening the valves to drain liquid from the tap ducts.

15. A method of measuring a flow rate of steam, comprising:
    conveying the steam through a conduit, wherein first and second tap ducts are coupled respectively to first and second ports through a wall of the conduit along part of the conduit that defines a fluid-flow-pressure-change-inducing section;
    closing first and second valves disposed respectively along the first and second tap ducts;
    introducing liquid into ends of the tap ducts distal relative to the conduit, wherein the liquid fills first and second sensing ducts;
    opening the valves to drain liquid from the tap ducts oriented to extend from the wall of the conduit at an angle less than 90° from vertical, which is defined as parallel to gravitational force;
    detecting a differential pressure across the section, wherein the differential pressure is established through the ports and tap ducts; and
    calculating the flow rate of the steam based on the differential pressure detected.

16. The method of claim 15, wherein the angle is between 15° and 75°.

17. The method of claim 15, wherein the fluid flow pressure change inducing section comprises a Venturi.

18. The method of claim 15, wherein the first port is located in a larger inner diameter of the conduit than the second port.

19. The method of claim 15, wherein the first and second ports are located around a circumference of the conduit corresponding with the angle.

20. The method of claim 15, further comprising calibrating a differential pressure sensor based on the liquid filling the first and second sensing ducts.

* * * * *